US009637352B2

(12) United States Patent
Daws

(10) Patent No.: US 9,637,352 B2
(45) Date of Patent: May 2, 2017

(54) METHOD OF MANUFACTURING A DISPLAY PANEL, SAID DISPLAY PANEL BEING OPERABLE TO ENABLE CONTENT TO BE DISPLAYED ON A STEP OF AN ESCALATOR

(71) Applicant: Motion Icon (Proprietary) Limited, Sandton (ZA)

(72) Inventor: Nigel John Daws, Durban (ZA)

(73) Assignee: Motion Icon (Proprietary) Limited, Pinetown, Durban (ZA)

( * ) Notice: Subject to any disclaimer, the term of this patent is extended or adjusted under 35 U.S.C. 154(b) by 0 days.

(21) Appl. No.: 14/650,182

(22) PCT Filed: Sep. 30, 2013

(86) PCT No.: PCT/IB2013/058995
§ 371 (c)(1),
(2) Date: Jun. 5, 2015

(87) PCT Pub. No.: WO2014/087265
PCT Pub. Date: Jun. 12, 2014

(65) Prior Publication Data
US 2015/0329327 A1    Nov. 19, 2015

(30) Foreign Application Priority Data

Dec. 6, 2012  (ZA) .................................. 2012/09208

(51) Int. Cl.
*B66B 23/12*    (2006.01)
*G09F 23/00*    (2006.01)
(Continued)

(52) U.S. Cl.
CPC .............. *B66B 23/12* (2013.01); *G09F 19/22* (2013.01); *G09F 23/00* (2013.01); *B29C 59/007* (2013.01);
(Continued)

(58) Field of Classification Search
CPC . B66B 23/12; B66B 1/00; G09F 19/22; G09F 23/00; B29C 2791/006;
(Continued)

(56) References Cited

U.S. PATENT DOCUMENTS 5,411,127 A    5/1995    Findlay

FOREIGN PATENT DOCUMENTS

AU    2001100174 A4 *    8/2001
DE    3704388 A1 *    8/1988    ........... B66B 31/003
(Continued)

OTHER PUBLICATIONS

International Search Report and Written Opinion issued in International Application No. PCT/IB2013/058995, mailed Mar. 17, 2014.

*Primary Examiner* — Philip Tucker
*Assistant Examiner* — Vicki Wu
(74) *Attorney, Agent, or Firm* — Mintz Levin Cohn Ferris Glovsky and Popeo, P.C.

(57) ABSTRACT

A method of manufacturing a display panel which is operable to enable content to be displayed on a step of an escalator, the method comprising the steps (102) of printing desired advertising content on a surface of a generally rigid plastic sheet; manufacturing (104) a vacuum formed sheet by vacuum forming the printed plastic sheet to fit a desired part of an escalator step profile; trimming (106) the vacuum formed sheet on all four sides; and applying (110) an adhesive substance to an operatively back surface of the vacuum formed sheet.

4 Claims, 3 Drawing Sheets

(51) Int. Cl.
*G09F 19/22* (2006.01)
*B66B 1/00* (2006.01)
*B29C 65/48* (2006.01)
*B29C 65/00* (2006.01)
*B29C 59/00* (2006.01)
*B29C 65/74* (2006.01)

(52) U.S. Cl.
CPC .............. *B29C 65/00* (2013.01); *B29C 65/48* (2013.01); *B29C 65/74* (2013.01); *B29C 66/70* (2013.01); *B29C 66/7392* (2013.01); *B29C 2791/004* (2013.01); *B29C 2791/006* (2013.01); *B66B 1/00* (2013.01)

(58) Field of Classification Search
CPC ... B29C 2791/004; B29C 65/48; B29C 65/00; B29C 66/70; B29C 66/7392; B29C 59/007; B29C 65/74
USPC ........................................................ 156/242
See application file for complete search history.

(56) References Cited

FOREIGN PATENT DOCUMENTS

| | | | | |
|---|---|---|---|---|
| DE | 202011102953 U1 | * | 8/2011 | ............... G09F 3/08 |
| EP | 1550993 A2 | | 7/2005 | |
| IN | 200400387 I1 | * | 4/2009 | |
| JP | 10218546 A | * | 8/1998 | |
| JP | H11 79643 A | | 3/1999 | |
| NZ | WO 9222491 A1 | * | 12/1992 | ............. B66B 23/12 |
| WO | WO-92/22491 | | 12/1992 | |

* cited by examiner

METHOD OF MANUFACTURING A DISPLAY PANEL, SAID DISPLAY PANEL BEING OPERABLE TO ENABLE CONTENT TO BE DISPLAYED ON A STEP OF AN ESCALATOR

This patent application is a national stage application, filed under 35 U.S.C. §371, of International Application No. PCT/IB2013/058995, filed on Sep. 30, 2013, which claims priority to South African Patent Application No. 2012/09208, filed on Dec. 16, 2012, the contents of which are hereby fully incorporated by reference in their entireties.

FIELD OF THE INVENTION

The present invention relates to a method of manufacturing a display panel, the display panel being operable to enable content to be displayed on a step of an escalator.

BACKGROUND TO THE INVENTION

An escalator is a moving staircase—a conveyor transport device for carrying people between floors of a building. The device consists of a motor-driven chain of individual, linked steps that move up or down on tracks, allowing the step treads to remain horizontal. Modern escalators have single-piece aluminium or stainless steel steps that move on a system of tracks in a continuous loop.

It is to be appreciated that conventionally the steps of an escalator are solid, one piece, die-cast aluminium or steel. In most escalator models manufactured after 1950, both the riser and the tread of each step is cleated (given a ribbed appearance) with comb-like protrusions that mesh with the comb-plates on the top and bottom platforms and the succeeding steps in the chain. Seeberger- or "step-type" escalators featured flat treads and smooth risers; other escalator models have cleated treads and smooth risers. The steps are linked by a continuous metal chain that forms a closed loop. The front and back edges of the steps are each connected to two wheels. The rear wheels are set further apart to fit into the back track and the front wheels have shorter axles to fit into the narrower front track. As such, it is to be appreciated that the cleated feature of the steps is essential for the proper functioning of the escalator.

It is further to be appreciated that the escalators are generally positioned so as to be easily seen and accessible by the general public. As such, escalators, and more particularly the steps of escalators, are prime positions on which to place advertising material as it is sure to be received by a wide audience.

However, due to the cleated design of the majority of the steps of escalators, the placing of advertising material on these steps is often regarded as an onerous and cumbersome process. The advertising material which is so placed should meet the further requirement of not interfering with the proper functioning of the escalator.

OBJECT OF THE INVENTION

The object of this invention is to provide a method of enabling content to be displayed on a step of an escalator, which will at least partially alleviate the above problem and provide the advantage indicated above.

SUMMARY OF THE INVENTION

According to a first aspect of the invention, there is provided a method of manufacturing a display panel, the display panel being operable to enable content to be displayed on a step of an escalator, the method comprising the steps of:

printing desired advertising content on a surface of a generally rigid plastic sheet;

manufacturing a vacuum formed sheet by vacuum forming the printed plastic sheet to fit a desired part of an escalator step profile;

trimming the vacuum formed sheet on all four sides; and applying an adhesive substance to an operatively back surface of the vacuum formed sheet.

The plastic sheet may be manufactured from a polyvinyl chloride (PVC), styrene or other rigid plastic material.

The plastic sheet may be approximately 500 microns in thickness. In a preferred embodiment of the invention, the plastic sheet may be less than 400 microns in thickness.

In an embodiment of the invention, the method may further comprise the steps of:

identifying one or more steps on the escalator for placing the rigid plastic sheet;

switching off the escalator;

cleaning an operatively vertically displaced side of the one or more steps with a degreasing agent;

exposing the adhesive substance on the plastic sheet; and positioning the plastic sheet over the vertically displaced side of the step and applying pressure by means of one or more rollers so as to ensure it is affixed thereto.

BRIEF DESCRIPTION OF THE DRAWINGS

These and other features of this invention will become apparent from the following description of one example described with reference to the accompanying drawings in which.

DETAILED DESCRIPTION OF THE INVENTION

Figure 1:
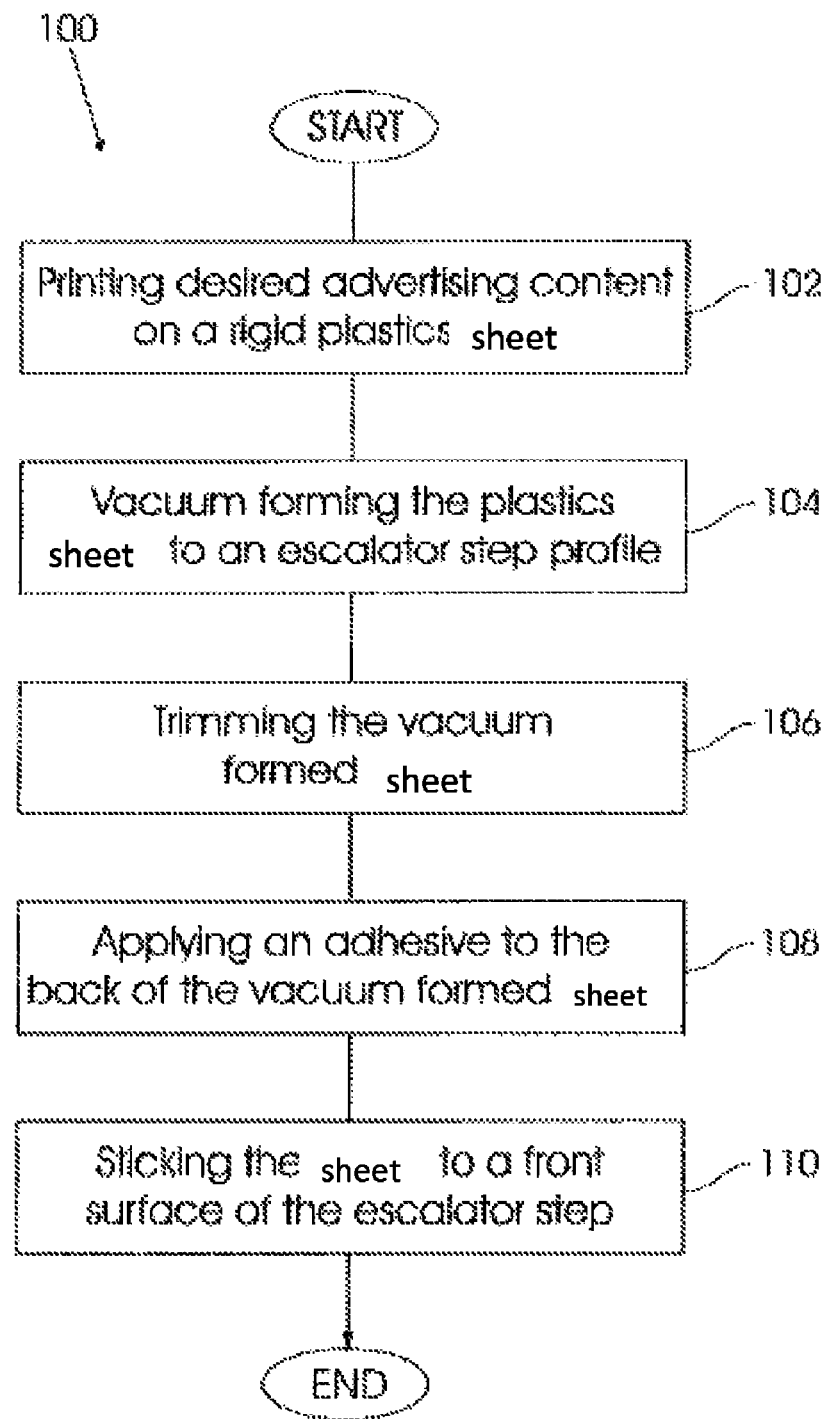
FIG. 1 shows a method of manufacturing a display panel, said display panel being operable to enable content to be displayed on a step of an escalator, in accordance with embodiments of the invention.

With reference to FIG. 1, a method for enabling content to be displayed on a step of an escalator is generally indicated by reference numeral 100.

In accordance with the method 100, at block 102, the desired advertising content is printed onto a generally rigid plastic sheet. In accordance with embodiments of the invention, the plastic sheet may be provided in the form of a polyvinyl chloride (PVC), styrene or another similar, rigid plastic material.

At block 104, the plastic sheet is vacuum formed to fit the surface profile of at least one side of a step of the escalator. More particularly, the cleats (i.e. the ribbed appearance) of each of the steps, is emulated on the plastic sheet. It is to be appreciated that this enables the plastic board to take the shape of the cleats of an escalator step provided by a specific manufacturer.

At block 106, the sides of the plastic sheet are trimmed so as to ensure that the plastic sheet does not protrude beyond the operatively outer edges of the escalator step.

At block 108, an adhesive substance is applied to the operatively back surface of the plastic sheet so as to enable the plastic sheet to be adhered to the step.

At block 110, the plastic sheet is affixed to the escalator step. More particularly, the requisite steps are identified on the escalator on which the plastic sheet is to be placed, the escalator is switched off, the operatively vertically displaced side profile of the steps are cleaned with a degreasing agent, a release paper is removed from the back surface of the plastic sheet and the sheet is positioned over the cleaned area of the step.

Pressure is applied by means of one or more rollers so as to ensure that the sheet is affixed to the step.

Figure 2:
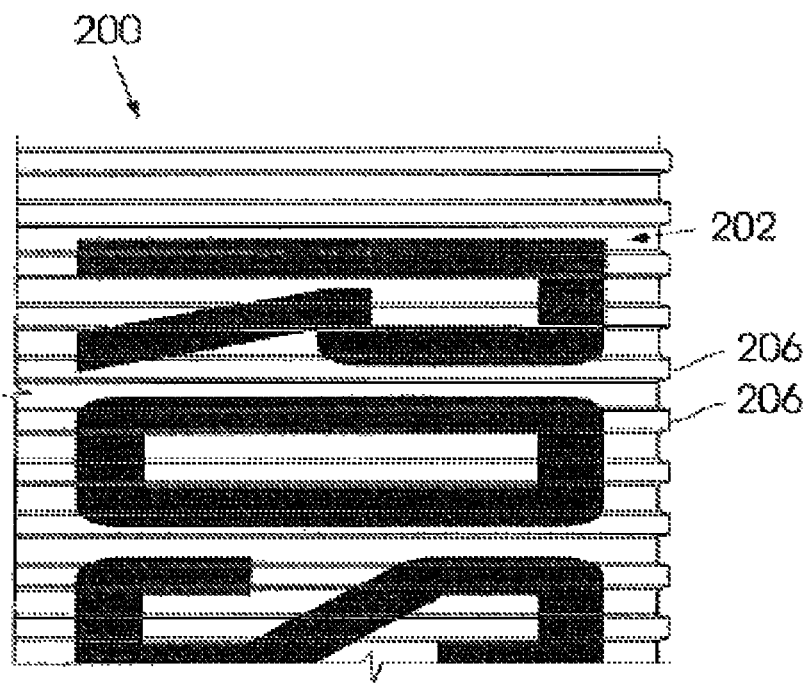
FIG. 2 shows a system including a display panel for the display of content on a step of an escalator, in accordance with embodiments of the implementation of the invention.
Figure 2:
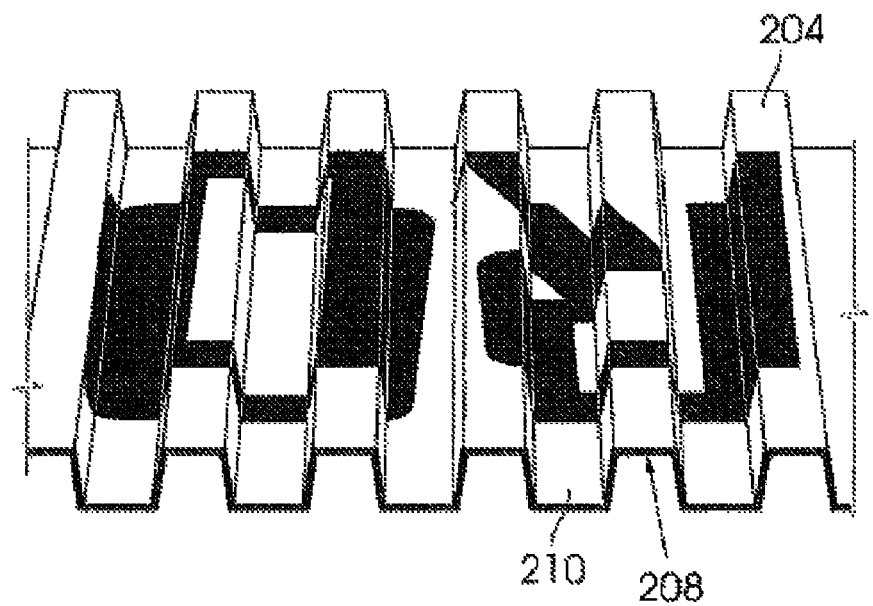

With reference to FIG. 2, a method which provides for the display of content on a step of an escalator is generally indicated by reference numeral 200.

A front profile of the plastic sheet is exemplified by reference numeral 202. The cleats 206 in the plastic sheet are clearly visible in the front profile view.

The side profile of the plastic sheet is exemplified by reference numeral 204. Similarly the elevations 208 and grooves 210 which form these cleats 206 are clearly visible with the side profile view.

Figure 3:
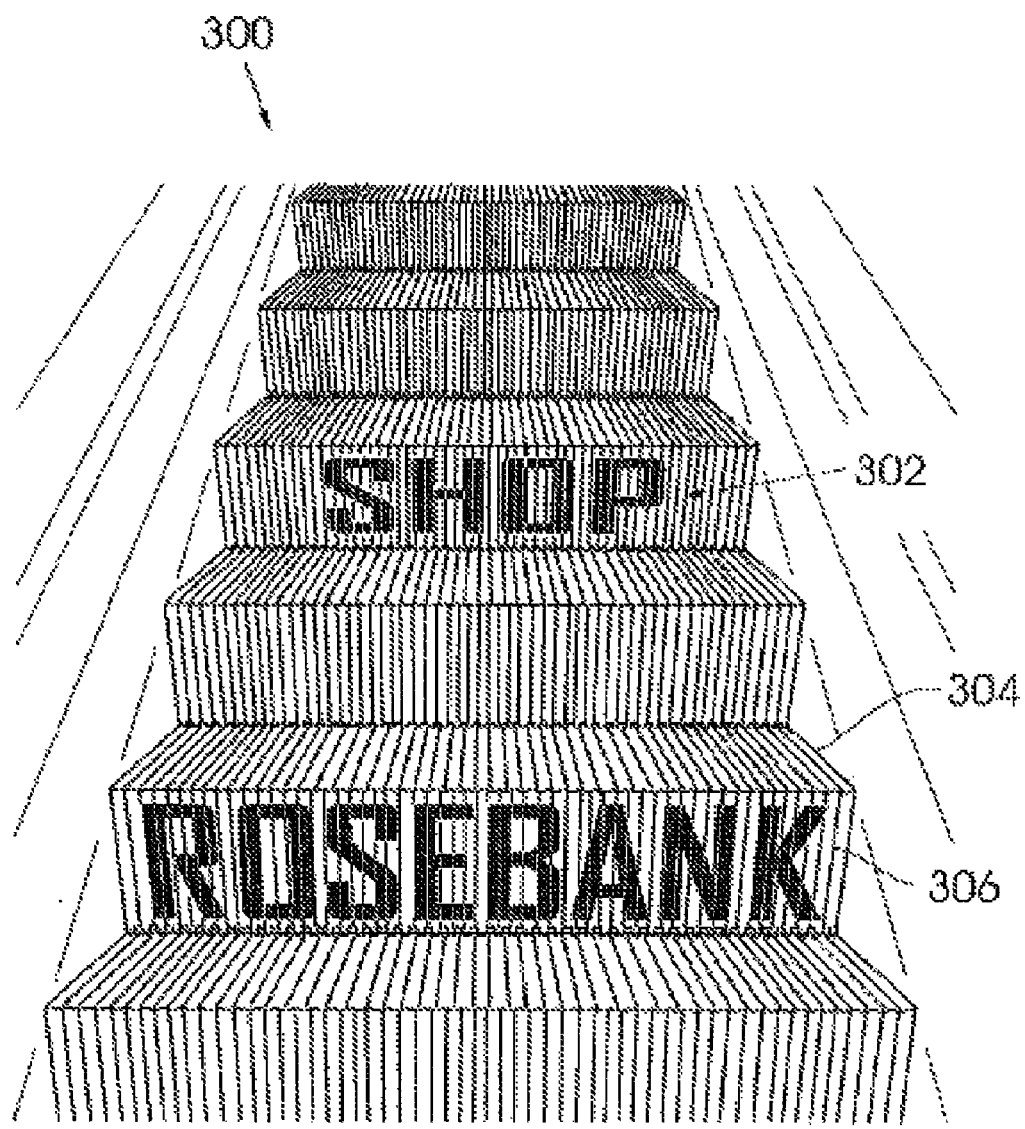
FIG. 3 shows the system of FIG. 2, in use on an escalator.

With reference to FIG. 3, the method of FIG. 2, in use on an escalator, is generally indicated by reference numeral 300.

The escalator 300 comprises a rigid vacuum formed plastic sheet 302 affixed to the operatively front profile of an escalator step 306. In this regard, it is to be appreciated that not all of the steps 304 need be included.

It will be understood that various embodiments of the method of the invention are possible without departing from the scope hereof.

The invention claimed is:

1. A method of manufacturing a display panel operable to enable content to be displayed on a step of an escalator, the method comprising:
    printing desired advertising content on a surface of a rigid plastic sheet having a thickness of approximately 500 microns;
    manufacturing a vacuum formed sheet by vacuum forming the plastic sheet to fit a desired part of an escalator step profile, the plastic sheet comprising a front surface and a back surface, the front surface and the back surface both comprising a plurality of cleats, each cleat having an elevation and a groove, the cleats conforming to escalator cleats on the escalator step profile;
    trimming the vacuum formed sheet on all four sides; and
    applying an adhesive substance to the back surface of the vacuum formed sheet.

2. The method of claim 1, wherein the plastic sheet is manufactured from a polyvinyl chloride (PVC), styrene or other rigid plastic material.

3. The method of claim 2, wherein the plastic sheet is less than 400 microns in thickness.

4. The method of claim 1, wherein the display panel is affixed to one or more steps of the escalator, the affixing comprising:
    identifying one or more steps on the escalator for placing the rigid plastic sheet;
    switching off the escalator;
    cleaning an vertically displaced side of the one or more steps with a degreasing agent;
    exposing an adhesive substance on the plastic sheet by removal of a release paper from the back surface of the plastic sheet; and
    positioning the plastic sheet over the vertically displaced side of the step and applying pressure by means of one or more rollers so as to ensure it is affixed thereto.

* * * * *